United States Patent
Conrad et al.

(10) Patent No.: US 8,528,555 B2
(45) Date of Patent: Sep. 10, 2013

(54) COCKPIT OXYGEN SUPPLY DEVICE

(75) Inventors: Rüdiger Conrad, Stockelsdorf (DE);
Heiko Marz, Lübeck (DE);
Jan-Sebastian Brandes, Bad Schwartau (DE)

(73) Assignee: B/E Aerospace Systems GmbH, Lübeck (DE)

( * ) Notice: Subject to any disclaimer, the term of this patent is extended or adjusted under 35 U.S.C. 154(b) by 878 days.

(21) Appl. No.: 12/619,936

(22) Filed: Nov. 17, 2009

(65) Prior Publication Data
US 2010/0122700 A1    May 20, 2010

(30) Foreign Application Priority Data
Nov. 19, 2008   (DE) .................. 10 2008 057 991

(51) Int. Cl.
*A61M 11/00*   (2006.01)

(52) U.S. Cl.
USPC .............. 128/204.23; 128/204.21; 128/204.18

(58) Field of Classification Search
USPC ............. 128/204.18, 204.21, 204.23, 205.23, 128/202.11; 73/706, 716, 736
See application file for complete search history.

(56) References Cited

U.S. PATENT DOCUMENTS

| | | | | |
|---|---|---|---|---|
| 3,665,767 A | * | 5/1972 | Welk, Jr. | 73/716 |
| 3,903,881 A | * | 9/1975 | Weigl | 128/204.25 |
| 4,461,180 A | * | 7/1984 | Hellouin de Menibus | 73/706 |
| 5,007,421 A | * | 4/1991 | Stewart | 128/204.18 |
| 6,006,596 A | * | 12/1999 | Blumenstock et al. | 73/114.43 |
| 8,225,788 B2 | * | 7/2012 | Manigel et al. | 128/204.21 |
| 2002/0148470 A1 | * | 10/2002 | Blue et al. | 128/204.22 |
| 2005/0145245 A1 | | 7/2005 | Jordan | |

FOREIGN PATENT DOCUMENTS
EP   1005829 A1   6/2000

* cited by examiner

*Primary Examiner* — Steven Douglas
(74) *Attorney, Agent, or Firm* — McGlew and Tuttle, P.C.

(57) ABSTRACT

A cockpit oxygen supply device includes at least one oxygen mask which is conductively connectable to an oxygen tank, wherein at least one throughput measurement device is arranged in the flow path of the device. A breathing activity of the pilot and/or an undesired outflow from the mask may be recognized with the help of an evaluation device.

12 Claims, 2 Drawing Sheets

COCKPIT OXYGEN SUPPLY DEVICE

CROSS REFERENCE TO RELATED APPLICATIONS

This application claims the benefit of priority under 35 U.S.C. §119 of German Patent Application DE 10 2008 057 991.2-22 filed Nov. 19, 2008, the entire contents of which are incorporated herein by reference.

FIELD OF THE INVENTION

The invention relates to a cockpit oxygen supply device with at least one oxygen mask conductively connectable to an oxygen tank.

BACKGROUND OF THE INVENTION

Cockpit oxygen supply devices are common in aircraft, in order to supply the cockpit crew with oxygen in the case of decompression of the cockpit. Such oxygen supply devices as a rule comprise at least one oxygen tank, to which several oxygen masks are connected, wherein the number of the oxygen masks connected to the oxygen tank is usually directed to the number of persons acting in the cockpit.

With the oxygen supply devices of this type which have been known until now, operating errors often lead to the oxygen inadvertently being let off out of the oxygen tanks, so that often an inadequate oxygen pressure prevails at the oxygen masks in a case of need. Such an inadequate pressurisation of the oxygen masks, although being displayed visually by way of mechanical switch logics on the oxygen masks and their storage containers, this display however disadvantageously is only effected when the cockpit oxygen supply device is no longer operational or only operational to an insufficient degree, and in the most unfavourable case, an aborting of the flight for refilling the oxygen tank with a correspondingly long airport stay is required.

SUMMARY OF THE INVENTION

Against this background, it is the object of the invention to provide a cockpit oxygen supply device which permits an improved functional monitoring.

The cockpit oxygen supply device according to the invention comprises at least one oxygen mask which may be conductively connected to an oxygen tank. The basic idea of the invention is to arrange at least one throughput measurement device in the flow path from the oxygen tank to the inner space of the mask body of the oxygen mask, with which throughput measurement device an unintended flow of oxygen out of the oxygen tank may be immediately recognized. This puts the cockpit crew, as the case may be, in the position of preventing a further outflow of oxygen by way of suitable measures, and in this manner, of avoiding the otherwise necessary aborting of the flight for refilling the oxygen tank.

Apart from the timely recognition of an outflow of oxygen from the cockpit oxygen supply device due to a fault, the throughput measurement device, in situations in which an oxygen supply of the cockpit crew is necessary by way of the cockpit oxygen supply device, also advantageously permits their proper use by way of the persons occupying the cockpit. For this, the throughput measurement device is usefully signal-connected to means for detecting a breathing activity. I.e. the throughput measurement device advantageously communicates with such means, with which one may ascertain whether the throughput values detected by the throughput measurement device are constant, which indicates a non-use of the cockpit oxygen supply device, or whether these throughput values change depending on breathing frequency and/or breathing depth, thus indicate a proper use of the cockpit oxygen supply device.

Particularly advantageously, the means for detecting the breathing activity form a part of the flight control system of the aircraft. In this context, one makes use of the fact that the breathing behaviour of the cockpit crew changes in certain flight situations. Thus for example the breathing frequency rises on descent. Advantageously, with the help of the means for detecting the breathing activity, it is possible to check the data which is determined by the flight control system and relates to the flight condition of the aircraft, by which means the flight safety may be further increased.

Given a faulty outflow of oxygen from the oxygen supply device as well as given a non-use of the oxygen supply device when this should actually be used, it is typically useful for the cockpit crew to be made aware of these facts. For this purpose, the throughput measurement device may advantageously be signal-connected to an alarm device. This alarm device may be designed in a manner such that it produces an acoustic warning signal and/or visual warning information in the situations specified above, wherein this signal or information then prompts the cockpit crew to rectify the error.

The throughput measurement device of the cockpit oxygen supply device according to the invention may basically have all types of sensors, which are suitable for detecting a volume flow in the flow path of the oxygen supply device. Preferably however, a differential pressure sensor is provided for determining the volume flow or for detecting the throughput of oxygen through the device. Usefully, this differential pressure sensor is designed in a manner such that it produces electrical or electronic measurement signals. Hereby, it may be the case of analog or digital measurement signals, which are led further to an electrical or electronic control. This control may be part of a throughput measurement device or it may hereby be the case of avionics which are usually present in aircraft. The evaluation of these signals is effected in the control device, wherein, as the case may be, an alarm device which may be part of the control, is prompted to issue an alarm signal.

A further advantageous design of the cockpit oxygen supply device according to the invention envisages arranging an orifice plate (orifice) in the flow path, for producing a pressure difference in this flow path from the oxygen tank to the oxygen mask, said pressure difference preferably being detectable by a differential pressure sensor. Thus a cross-sectional narrowing may be provided in the flow path, at which narrowing the flow speed through the flow path increases, wherein the oxygen pressure reduces downstream of the cross-sectional narrowing, so that a difference between the oxygen pressure in front of the orifice and the oxygen pressure behind the orifice arises.

In order to be able to assign a non-use of the cockpit oxygen supply device to a certain member of the cockpit crew, preferably a throughput measurement device is arranged upstream of each oxygen mask of this cockpit oxygen supply device. With regard to this, a design with which at least one conduit branching is provided in a feed conduit connected to the oxygen tank at the exit side is advantageous, wherein this branching comprises a flow inlet and two flow outlets in each case leading to an oxygen mask, wherein a differential pressure sensor is assigned to each flow outlet and whereby in the context of the invention, a differential pressure sensor is to be understood as any differential pressure recognition. Typically, with more than two cockpit crew positions, one may provide a further such conduit branching or the conduit branching comprises more than two flow outlets.

Advantageously, in each case the flow inlet and a flow outlet of the conduit branching form pressure chambers of a differential pressure sensor, which are separated from one another by way of a membrane. Advantageously, a cross-sectional narrowing of the flow path is provided at the transition of the flow inlet to the flow outlet, for producing different pressures in the two pressure chambers of the differential pressure sensor.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
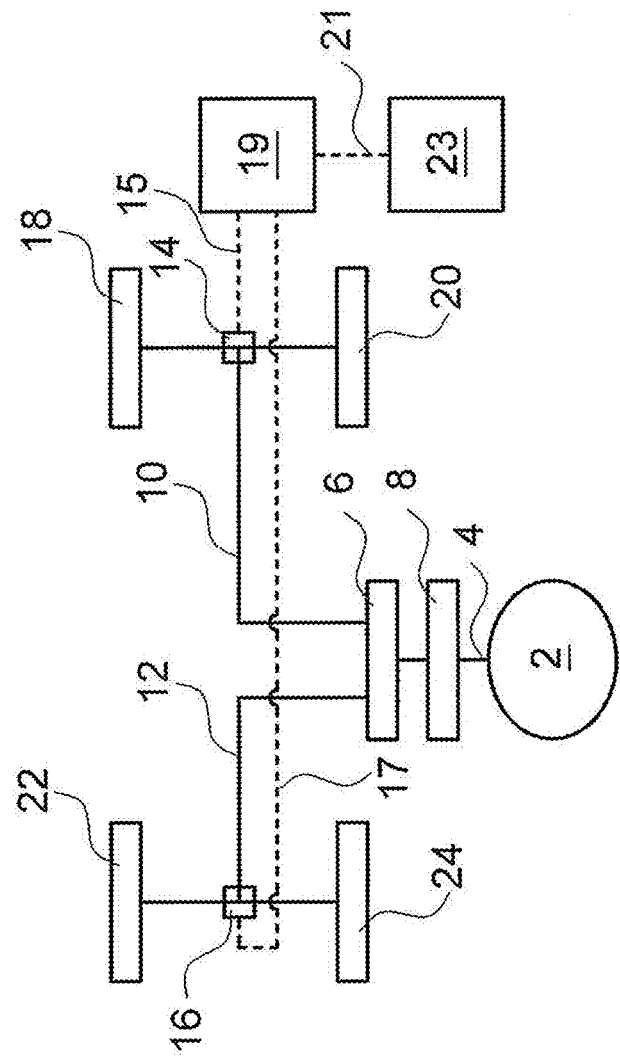
FIG. 1 is a cockpit oxygen supply device in a simplified block diagram.

Referring to the drawings in particular, the cockpit oxygen supply device represented in FIG. 1 is designed for the oxygen supply of four members of a cockpit crew of an aircraft. It comprises an oxygen source in the form of an oxygen tank 2, which is conductively connected via a conduit 4 connected to its oxygen outlet, to a distributor 6. On the exit side of the oxygen tank 2, a pressure reducer 8 is arranged in the usual manner in the conduit 4, with which pressure reducer the tank pressure of the oxygen tank 2 is reduced at least to a medium pressure.

The conduit 4 branches at the distributor 6 into two conduit lines 10 and 12. The conduit line 10 ends at a conduit branching 14. Corresponding to this, the conduit line 12 ends at a conduit branching 16. Both conduit branchings 14 and 16 in each case have two flow outlets, wherein oxygen masks 18 and 20 are connected to the flow outlets of the conduit branching 14, and oxygen masks 22 and 24 are connected to the flow outlets of the conduit branching 16.

In each case, a differential pressure sensor, with which an outflow of oxygen from the respective flow outlet is detected via a differential pressure, and which is not shown in FIG. 1, is provided on each of the flow outlets formed on the conduit branches 14 and 16. The pressure values detected at the conduit branching 14 are led further via a signal lead 15 to an evaluation device 19. Correspondingly, the pressure values determined at the conduit branching 16 are transferred likewise by way of a signal lead 17 to the evaluation device 19. The pressure values are evaluated in the evaluation device 19, which e.g. may be part of the avionics of the aircraft, and a suitable acoustic and/or visual alarm is activated via a signal lead 21 at an alarm device 23 in the case of incorrect pressure values.

Figure 2:
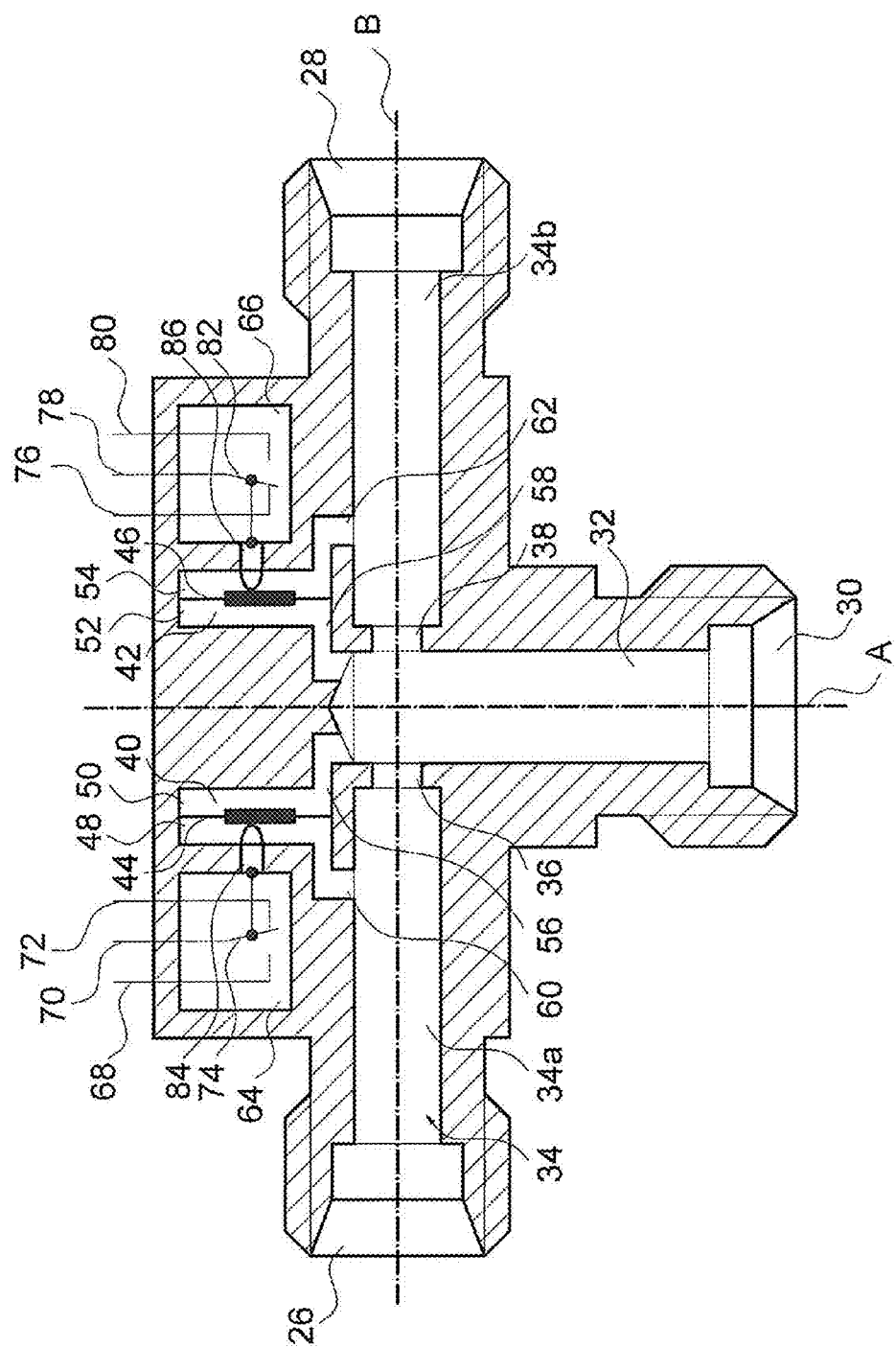
FIG. 2 is a conduit branching of the cockpit oxygen supply device according to FIG. 1, in a schematic longitudinal section.

FIG. 2 in a detailed manner shows the construction of the conduit branching 14 which is designed in an identical manner to the conduit branching 16. The conduit branching 14 has the shape of a T-piece, wherein two flow outlets 26 and 28 are arranged aligned perpendicularly to a flow inlet 30. In the conduit branching 14, a flow channel 32 departing from the flow outlet 30 crosses a flow channel 34, wherein a branch 34a of the flow channel 34 leads to the flow outlet 26, and a branch 34b to the flow outlet 28. A cross-sectional narrowing which forms an orifice 36, is formed where the flow channel 32 merges into the branch 34a of the flow channel 34, in the flow path from the flow channel 32 to the flow channel 34. In a corresponding manner, a cross-sectional narrowing at the transition from the flow channel 32 to the branch 34b of the flow channel 34 forms an orifice 38.

Two cavities 40 and 42 are formed in the conduit branching 14, at opposite sides of a middle plane A of the flow channel 32, which is aligned parallel to the cross-sectional area of the flow channel 34, and in each case on the side of a middle plane B of the flow channel 34, said side being distant to the flow inlet 30 and being aligned parallel to the cross-sectional area of the flow channel 32. These cavities 40 and 42 are separated by a membrane 44 or 46 into two halves, wherein the halves of the cavity 40 form chambers 48 and 50, and the halves of the cavity 42 form chambers 52 and 54.

The chamber 50 of the cavity 40 is conductively connected via a channel 56 to the flow channel 32 and thus to the flow inlet 30. In an analogous manner, the channel 52 of the cavity 42 is conductively connected via a channel 58 to the flow channel 32 and thus also to the flow inlet 30. A channel 60 connects the chamber 48 of the cavity 40 to the branch 34a of the flow channel 34, whilst the chamber 54 of the cavity 42 is conductively connected by way of a channel 62 to the branch 34b of the flow channel 34. In this manner, the chambers 48 and 50 form the pressure chambers 48 and 50 of a first differential pressure sensor, and the chambers 52 and 54 form the pressure chambers 52 and 54 of a second differential pressure sensor.

With respect to the middle plane A of the flow channel 32, in each case a further cavity 64 or 66 is arranged on the outside of the cavity 40 and of the cavity 42 respectively. Three electrical strip conductors 68, 70, 72 are led into the cavity 64. A two-way switch 74 is arranged on the middle strip conductor 70, and may be switched such that in a first switch position the strip conductors 70 and 72 form a common flow circuit, and in a second switch position the strip conductors 68 and 70 form a common flow circuit. Corresponding to this, three strip conductors 76, 78 and 80 are also led into the cavity 66, wherein a two-way switch 82 is arranged on the middle strip conductor 78 and in a first switch position connects the strip conductors 76 and 78 to one another, and in a second switch position connects the strip conductors 78 and 80 to one another.

If oxygen coming from the flow inlet 30 flows through the orifice 36, then the pressure of the oxygen behind, i.e. downstream of the orifice, reduces. Accordingly, the pressure chamber 48 is impinged with a lower pressure than the pressure chamber 50. The result of this is that the membrane 44 everts in the direction of the inner wall of the pressure chamber 48, which is arranged opposite it. By way of this, a peg 84 which is movably guided through the wall between the pressure chamber 48 and the cavity 64, is moved by the membrane 44 in a manner such that the two-way switch 74 coupled in movement with the peg 84 changes its switch position. In a similar manner, the membrane 46 everts in the direction of the outer wall of the pressure chamber 54, which lies opposite it, by which means a plug 86 which is movably guided through the wall between the pressure chamber 54 and the cavity 66, is moved such that the two-way switch 82 coupled in movement thereto likewise changes its switch position. The change of the switch position of the two-way switches 74 and 82 is detected by the evaluation device 19, to which the strip conductors 68, 70, 72, 76, 78 and 80 are connected, whereupon an optical and/or acoustic alarm signal may be produced by an alarm device, which is likewise not shown and which may be a constituent of the control or which may be signal-connected to the control.

While specific embodiments of the invention have been described in detail to illustrate the application of the principles of the invention, it will be understood that the invention may be embodied otherwise without departing from such principles.

APPENDIX

List of Reference Numerals
2—oxygen tank
4—conduit
6—distributor
8—pressure reducer
10—conduit line
12—conduit line
14—conduit branching
15—signal lead
16—conduit branching
17—signal lead
18—oxygen mask
19—evaluation device
20—oxygen mask
21—signal lead
22—oxygen mask
23—alarm device
24—oxygen mask
26—flow outlet
28—flow outlet
30—flow inlet
32—flow channel
34—flow channel
34a—branch
34b—branch
36—orifice
38—orifice
40—cavity
42—cavity
44—membrane
46—membrane
48—chamber, pressure chamber
50—chamber, pressure chamber
52—chamber, pressure chamber
54—chamber, pressure chamber
56—channel
58—channel
60—channel
62—channel
64—cavity
66—cavity
68—strip conductor
70—strip conductor
72—strip conductor
74—two-way switch
76—strip conductor
78—strip conductor
80—strip conductor
82—two-way switch
84—plug
86—plug
A—middle plane
B—middle plane

What is claimed is:

1. A cockpit oxygen supply device comprising:
an oxygen tank;
an oxygen mask conductively connectable to said oxygen tank;
a throughput measurement device arranged in a device flow path;
a feed conduit connected at an exit side to the oxygen tank, said feed conduit having at least one conduit branching comprising a flow inlet and two flow outlets; and
a differential pressure sensor assigned to each of said flow outlets, said flow inlet and said flow outlet forming pressure chambers of said differential pressure sensor, said pressure chambers being separated from one another by a membrane.

2. A cockpit oxygen supply device according to claim 1, further comprising:
means for detecting a breathing activity wherein the throughput measurement device is connected to said means for detecting a breathing activity and sends signals to said means for detecting a breathing activity.

3. A cockpit oxygen supply device according to claim 2, wherein said means for detecting the breathing activity form a part of the flight control system of the aircraft.

4. A cockpit oxygen supply device according to claim 1, further comprising:
an alarm device, wherein said throughput measurement device is connected to said alarm device and sends signals to said alarm device.

5. A cockpit oxygen supply device according to claim 1, wherein said differential pressure sensor comprises an orifice structure arranged in said flow path.

6. A cockpit oxygen supply device comprising:
an oxygen tank;
a plurality of oxygen masks;
a pressure reducer;
a conduit line connected to said oxygen tank via said pressure reducer; and
conduit branching connected to said conduit line, at least one of said plurality of oxygen masks being connected to said conduit branching, said conduit branching including a throughput measurement device, a conduit branching flow inlet and a plurality of mask connection flow outlets, said throughput measurement device comprising a differential pressure sensor between each of mask connection flow outlets and said conduit branching flow inlet, said differential pressure sensor comprising an orifice structure arranged in said conduit branching, said differential pressure sensor being assigned to each of said mask connection flow outlets, said conduit branching flow inlet and said mask connection flow outlet forming pressure chambers of said differential pressure sensor, said pressure chambers being separated from one another by a membrane.

7. A cockpit oxygen supply device according to claim 6, further comprising:
an evaluating device detecting a breathing activity wherein the throughput measurement device is connected to said evaluating device sends signals to said evaluating device.

8. A cockpit oxygen supply device according to claim 7, wherein said evaluating device forms a part of the flight control system of the aircraft.

9. A cockpit oxygen supply device according to claim 7, further comprising:
an alarm device, wherein said evaluating device is connected to said alarm device and sends signals to said alarm device.

10. A cockpit oxygen supply device comprising:
an oxygen tank;
a plurality of oxygen masks;
a pressure reducer;
a flow distributor, said pressure reducer being in fluid connection between said oxygen tank and said flow distributor;
a first conduit line connected to said flow distributor;
a second conduit line connected to said flow distributor;
a first conduit branching connected to said first conduit, at least two of said plurality of oxygen masks being connected to said first conduit branching, said first conduit branching including a first throughput measurement device, said first throughput measurement device defining a rate of volume flow between one of said at least two of said plurality of oxygen masks and said first conduit line; and
a second conduit branching connected to said second conduit, at least two other of said plurality of oxygen masks being connected to said second conduit branching, said second conduit branching including a second throughput measurement device, said second throughput measurement device defining another rate of volume flow between one of said at least two other of said plurality of oxygen masks and said second conduit line, each said throughput measurement device comprising a differential pressure sensor with an orifice structure arranged in said conduit branching and comprising a flow inlet and two flow outlets, said differential pressure sensor being assigned to each of said flow outlets, said flow inlet and said flow outlet forming pressure chambers of said differential pressure sensor, said pressure chambers being separated from one another by a membrane.

11. A cockpit oxygen supply device according to claim 10, further comprising:
an evaluating device detecting a breathing activity wherein the throughput measurement device is connected to said evaluating device sends signals to said evaluating device, wherein said evaluating device forms a part of the flight control system of the aircraft.

12. A cockpit oxygen supply device according to claim 11, further comprising:
an alarm device wherein said evaluating device is connected to said alarm device and sends signals to said alarm device.

* * * * *